(12) United States Patent
Wang et al.

(10) Patent No.: US 11,030,869 B2
(45) Date of Patent: Jun. 8, 2021

(54) METHOD OF COMMUNICATING BETWEEN A CLIENT-SERVER SYSTEM AND REMOTE CLIENTS

(71) Applicant: Purdue Research Foundation, West Lafayette, IN (US)

(72) Inventors: He Wang, West Lafayette, IN (US); Siyuan Cao, West Lafayette, IN (US); Habiba Farrukh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/807,068

(22) Filed: Mar. 2, 2020

(65) Prior Publication Data

US 2020/0287949 A1 Sep. 10, 2020

Related U.S. Application Data

(60) Provisional application No. 62/813,293, filed on Mar. 4, 2019.

(51) Int. Cl.
*G08B 13/196* (2006.01)
*H04L 29/12* (2006.01)
(Continued)

(52) U.S. Cl.
CPC ..... *G08B 13/19645* (2013.01); *G06K 9/3233* (2013.01); *G08B 13/19602* (2013.01);
(Continued)

(58) Field of Classification Search
CPC ..... H04L 65/00; H04L 65/40; H04L 65/4069; H04L 65/4076; H04L 65/60;
(Continued)

(56) References Cited

U.S. PATENT DOCUMENTS 6,975,346 B2 * 12/2005 Kumhyr ............ G06K 9/00288
348/143
8,588,818 B2 * 11/2013 Huang .................... H04W 4/02
455/456.3
(Continued)

OTHER PUBLICATIONS

Huffman, A method for the construction of minimum-redundancy codes, Proceedings of the IRE, vol. 40, No. 9, pp. 1098-1101,1952.
(Continued)

*Primary Examiner* — Boris D Grijalva Lobos
(74) *Attorney, Agent, or Firm* — Piroozi-IP, LLC

(57) ABSTRACT

A method of selectively broadcasting a message to a client by a server without knowing the client's internet protocol (IP) address includes receiving video feeds of an area of interest from one or more cameras, performing target recognition and tracking on one or more targets, including position of the one or more targets, extracting target-specific context parameters from the one or more recognized and tracked targets, encoding the target-specific context parameters into a header, thereby generating a context address for the one or more targets, appending the context address to a message for the one or more targets from a predetermined set of messages based on the position of the one or more targets, thereby generating one or more packets of information, and broadcasting the one or more packets wirelessly to one or more client mobile devices each associated with the one or more targets.

20 Claims, 17 Drawing Sheets
(9 of 17 Drawing Sheet(s) Filed in Color)

(51) Int. Cl.
*H04L 29/06* (2006.01)
*G06K 9/32* (2006.01)

(52) U.S. Cl.
CPC . *G08B 13/19608* (2013.01); *G08B 13/19682* (2013.01); *H04L 65/4076* (2013.01); *H04L 65/4092* (2013.01); *H04L 65/607* (2013.01); *H04L 65/608* (2013.01); *H04L 61/2503* (2013.01)

(58) Field of Classification Search
CPC ..... H04L 65/607; H04L 65/608; H04L 61/00; H04L 61/2503; G06K 9/00; G06K 9/20; G06K 9/32; G06K 9/3233; G06K 9/3291; G08B 13/00; G08B 13/18; G08B 13/189; G08B 13/19; G08B 13/194; G08B 13/196; G08B 13/19602–19608; G08B 13/19613; G08B 13/19654; G08B 13/1636; G08B 13/19645; G08B 13/19682; G08B 27/00; G08B 27/001; G08B 27/005; G08B 9/00; G08B 9/2018
See application file for complete search history.

(56) References Cited

U.S. PATENT DOCUMENTS

| | | | | |
|---|---|---|---|---|
| 9,245,433 | B1* | 1/2016 | Butler | H04L 61/1547 |
| 9,811,915 | B2* | 11/2017 | Stephenne | G06T 7/20 |
| 9,842,496 | B1* | 12/2017 | Hayward | G01S 19/13 |
| 2008/0115174 | A1* | 5/2008 | Nicholl | G08B 27/001 |
| | | | | 725/62 |
| 2008/0247345 | A1* | 10/2008 | Bahar | H04L 63/18 |
| | | | | 370/310 |
| 2011/0058034 | A1* | 3/2011 | Grass | H04N 7/18 |
| | | | | 348/143 |
| 2015/0109104 | A1* | 4/2015 | Fadell | H04L 67/12 |
| | | | | 340/5.65 |
| 2016/0050037 | A1* | 2/2016 | Webb | G08B 27/005 |
| | | | | 455/3.01 |
| 2016/0180152 | A1* | 6/2016 | Rosenkrantz | G06K 9/6202 |
| | | | | 382/118 |
| 2017/0251182 | A1* | 8/2017 | Siminoff | H04N 5/232411 |
| 2019/0394609 | A1* | 12/2019 | Sugiyama | H04W 4/021 |

OTHER PUBLICATIONS

Llorca et al., Recognizing individuals in groups in outdoor environments combining stereo vision, rfid and ble, Cluster Computing, vol. 20, No. 1, pp. 769-779, Mar. 2017.
Takacs et al., Outdoors augmented reality on mobile phone using loxel-based visual feature organization, in ACM ICMR, 2008.
Chen et al., Sensor-assisted facial recognition: An enhanced biometric authentication system for smartphones, in Proceedings of the 12th Annual International Conference on Mobile Systems, Applications, and Services, ser. MobiSys 14. New York, NY, USA: ACM, 2014, pp. 109-122.
Jain et al., Overlay: Practical mobile augmented reality, in Proceedings of the 13th Annual International Conference on Mobile Systems, Applications, and Services. ACM, 2015, pp. 331-344.
Li et al., Id-match: A hybrid computer vision and rfid system for recognizing individuals in groups, in Proceedings of the 2016 CHI Conference on Human Factors in Computing Systems, ser. CHI '16. New York, NY, USA: ACM, 2016, pp. 4933-4944.
Jung et al., Towards cooperative localization of wearable sensors using accelerometers and cameras, in INFOCOM, 2010 Proceedings IEEE. IEEE, 2010, pp. 1-9.
Wang et al., Insight: recognizing humans without face recognition, in Proceedings of the 14th Workshop on Mobile Computing Systems and Applications. ACM, 2013, p. 7.
Cao et al., Enabling public cameras to talk to the public, Proc. ACM Interact. Mob. Wearable Ubiquitous Technol., vol. 2, No. 2, pp. 63:1-63:20, Jul. 2018.
Liu et al., Tar: Enabling tine-grained targeted advertising in retail stores, in MobiSys, 2018.
Dolla'r et al., Crosstalk cascades for frame-rate pedestrian detection, in ECCV, 2012, pp. 645-659.
Cao et al., Realtime multi-person 2d pose estimation using part affinity fields, in CVPR, 2017.
Simon et al., Hand keypoint detection in single images using multiview bootstrapping, in CVPR, 2017.
Wei et al., Convolutional pose machines, in CVPR, 2016.
Perera et al., Multi-object tracking through simultaneous long occlusions and split-merge conditions, in Computer Vision and Pattern Recognition, 2006 IEEE Computer Society Conference on, vol. 1. IEEE, 2006, pp. 666-673.
Xing et al., Multi-object tracking through occlusions by local tracklets filtering and global tracklets association with detection responses, in Computer Vision and Pattern Recognition, 2009. CVPR 2009. IEEE Conference on. IEEE, 2009, pp. 1200-1207.
Andriyenko et al., Multi-target tracking by continuous energy minimization, in Computer Vision and Pattern Recognition (CVPR), 2011 IEEE Conference on. IEEE, 2011, pp. 1265-1272.
Pirsiavash et al., Globally-optimal greedy algorithms for tracking a variable number of objects, in Com-puter Vision and Pattern Recognition (CVPR), 2011 IEEE Conference on. IEEE, 2011, pp. 1201-1208.
Yang et al., Online learned discriminative part-based appearance models for multi-human tracking, in European Conference on Computer Vision. Springer, 2012, pp. 484-498.
Nang et al., Superpixel tracking, in Computer Vision (ICCV), 2011 IEEE International Conference on. IEEE, 2011, pp. 1323-1330.
Liu et al., Robust tracking using local sparse appearance model and k-selection, in Computer Vision and Pattern Recognition (CVPR), 2011 IEEE Conference on. IEEE, 2011, pp. 1313-1320.
Grabner et al., Tracking the invisible: Learning where the object might be, in Computer Vision and Pattern Recognition (CVPR), 2010 IEEE Conference on. IEEE, 2010, pp. 1285-1292.
Kalman, A new approach to linear filtering and prediction problems, Journal of basic Engineering, vol. 82, No. 1, pp. 35-45,1960.
Peterfreund, Robust tracking of position and velocity with kalman snakes, IEEE transactions on pattern analysis and machine intelligence, vol. 21, No. 6, pp. 564-569, 1999.

* cited by examiner

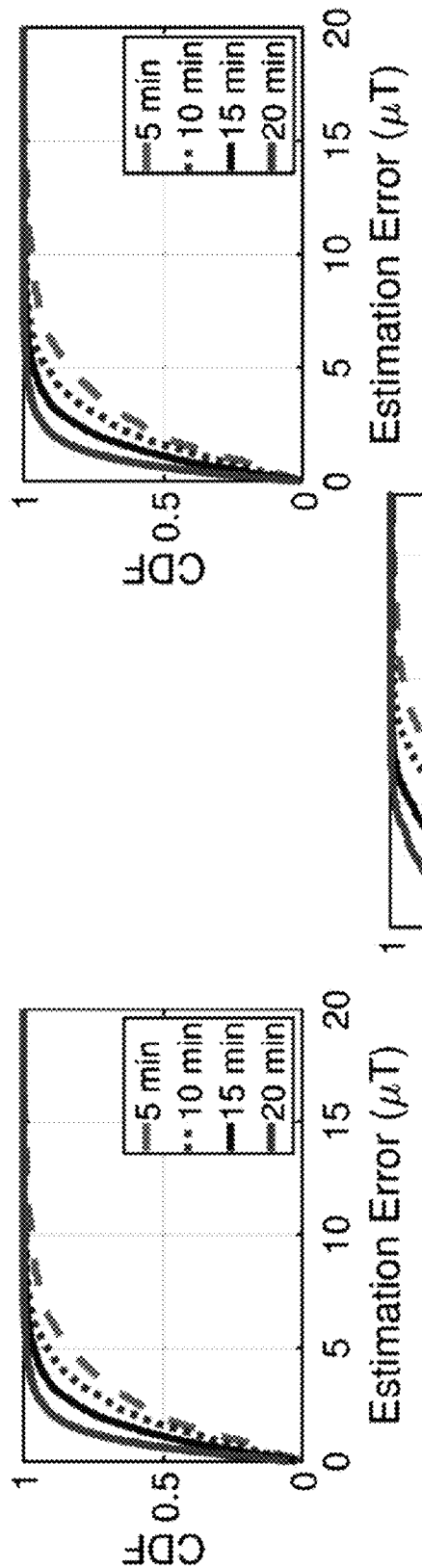
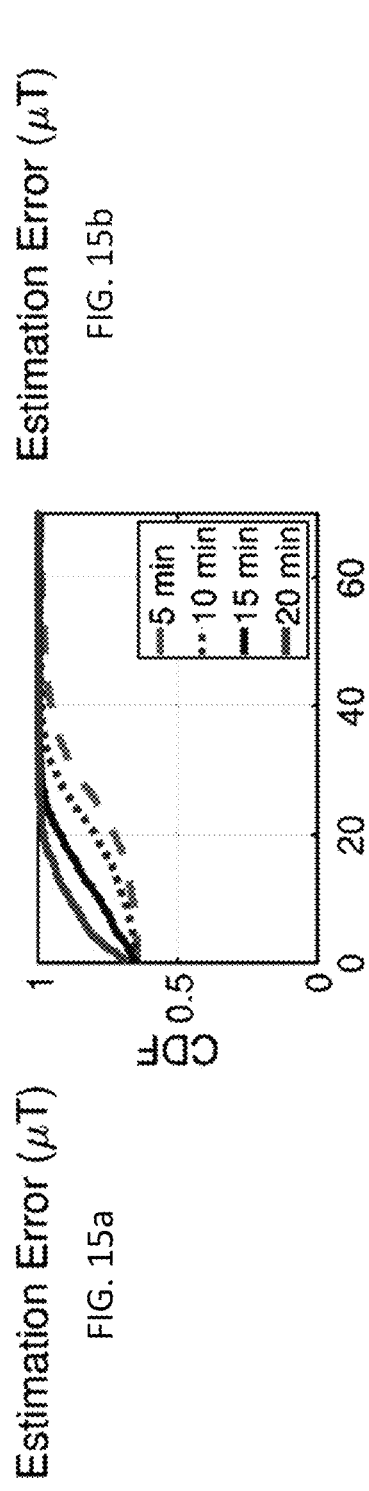
FIG. 15a
FIG. 15b
FIG. 15c

METHOD OF COMMUNICATING BETWEEN A CLIENT-SERVER SYSTEM AND REMOTE CLIENTS

CROSS-REFERENCE TO RELATED APPLICATIONS

The present patent application is related to and claims the priority benefit of U.S. Provisional Patent Application Ser. No. 62/813,293, filed Mar. 4, 2019, the contents of which are hereby incorporated by reference in its entirety into the present disclosure.

STATEMENT REGARDING GOVERNMENT FUNDING

The technology described in the present disclosure was not made with Government Support.

TECHNICAL FIELD

The present disclosure generally relates to data processing from cameras, and in particular to interaction of camera data with smartphones of one or more users.

BACKGROUND

This section introduces aspects that may help facilitate a better understanding of the disclosure. Accordingly, these statements are to be read in this light and are not to be understood as admissions about what is or is not prior art.

Network cameras that are private or publicly accessible are now ubiquitous. These cameras provide image data (still image, e.g., in .JPG format, or video image, e.g., in. MP4 format), to a server which then processes the data. Additionally, nowadays, recognition software systems are commonplace. These systems interrogate image data provided from these network cameras and determine various characteristics in the data stream. For example, following and tracking individuals and objects from one camera frame to another camera frame is now known. For example U.S. Pub. App. 20180324141 for Wang et al., incorporated herein by reference in its entirety into the present disclosure, describes one such approach. In this reference, a method is disclosed which includes i) identifying a plurality of tracklets from a plurality of targets, and ii) extracting motion features of the target sourced from the plurality of tracklet. The extracted motion features of each target of the plurality of targets are distinguishable from the motion features of remaining targets. While, these interrogations are typically used only for identifying motion and even identity of a target, not much else is achieved from these interrogations. That is, the interactions between the cameras and the targets are one-way (i.e., data extracted from targets). However, due to various concerns, e.g., privacy, additional identification of targets are not typically performed. However, it may be useful to provide selective information to the targets in an anonymous approach without the need to identify the targets. However, such a system does not exist.

Therefore, there is an unmet need for a novel approach that interrogates network cameras, identifies presence of targets, and provides selective information to the targets using an anonymous approach.

SUMMARY

A method of selectively broadcasting a message to a client by a server without knowing the client's internet protocol (IP) address is disclosed. The method includes receiving video feeds of an area of interest from one or more cameras in communication with a server. The method further includes performing target recognition and tracking on one or more targets within the area of interest, including position of the one or more targets. The method also includes extracting target-specific context parameters from the one or more recognized and tracked targets. In addition, the method include encoding the target-specific context parameters into a header, thereby generating a context address for the one or more targets. The method also includes appending the context address to a message for the one or more targets from a predetermined set of messages based on the position of the one or more targets, thereby generating one or more packets of information. Furthermore, the method includes broadcasting the one or more packets wirelessly to one or more client mobile devices each associated with the one or more targets.

A client-server system adapted to broadcast selective messages to one or more clients without knowing the internet protocol address of the clients is also disclosed. The system includes a server having a server processor adapted to execute a computer-readable program encoded on a non-transitory computer-readable medium. The system also includes one or more cameras in communication with the server each adapted to provide a video feed of an area of interest. The system also includes one or more client mobile devices each hosted by a corresponding user (target), each of the one or more client mobile devices adapted to receive broadcasted signals form the server. The server processor is configured to receive video feeds from the one or more camera. The server processor is also configured to perform target recognition and tracking on the one or more targets, including position of the one or more targets, extract target-specific context parameters from the one or more recognized and tracked targets, encode the target-specific context parameters into a header, thereby generate a context address for the one or more targets, append the context address to a message for the one or more targets from a predetermined set of messages based on the position of the one or more targets, thereby generate one or more packets of information; and broadcast the one or more packets wirelessly to the one or more client mobile devices.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 15a and 15b are graphs of cumulative distribution function (CDF) vs. estimation error of magnetometer readings which show that as there are more and more sensor data, errors of the mean and the standard deviation of the difference gradually and steadily decrease over time.

FIG. 15c is a graph of CDF v. estimation error in of WI-FI signals which shows that as more WI-FI readings are uploaded, the WI-FI fingerprint map gradually approaches the ground truth.

DETAILED DESCRIPTION

Figure 1:
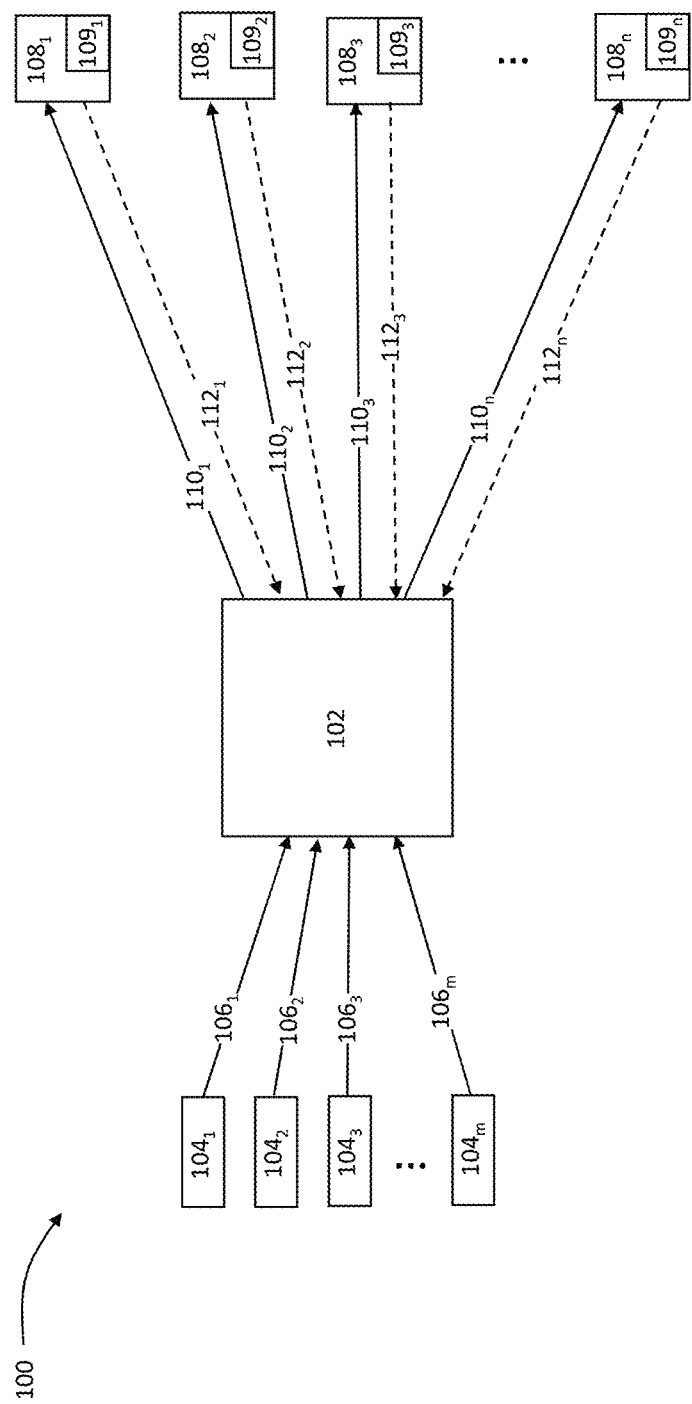
FIG. 1 is a block diagram of a system according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is presented that interrogates network cameras, identifies presence of targets, and provides selective information to the targets using an anonymous approach. Referring to FIG. 1, a block diagram of system 100 according to the present disclosure is presented. The system 100 includes a central server 102 which received image data in the form of still images, e.g., using .JPG format, and video images, e.g., using .MP4 format, from a plurality of cameras $104_1$, $104_2$, $104_3$, . . . $104_m$ (or selectively identified as $104_i$, not shown). The server 102 interrogates image data from the camera $104_i$ and identifies a plurality of targets $108_1$, $108_2$, $108_3$, . . . $108_n$ (or selectively identified as $108_i$, not shown) in the image fields. Each target $108i$ is assumed to have a smartphone $109_1$, $109_2$, $109_3$, . . . $109_n$ (or selectively identified as $109_i$, not shown). Data from the cameras $104_i$ is provided in a one-way format as identified by arrows $106_1$, $106_2$, $106_3$, . . . $106_m$ (or selectively identified as $106i$, not shown), while data is communicated to the targets $108_i$ and his/her smartphones $109_i$ in either a one-way—as indicated by arrows $110_1$, $110_2$, $110_3$, . . . $110_n$ (or selectively identified as $110_i$, not shown), or optionally a two-way format—as further indicated by arrows $112_1$, $112_2$, $112_3$, . . . $112_n$ (or selectively identified as $112_i$, not shown). As discussed more fully below, in the case of the one-way communication with the smartphones $109_i$, the server 102 selectively broadcast data to smartphones $109_i$ based on a variety of target-specific identifiers (hereinafter referred to as tracklets) from the targets $108_i$, and other environmental identifiers, obtained apriori, and combined with the target-specific tracklets in order to establish locational information about the one or more targets $108_i$. In the case of the two-way communication with the smartphones $109_i$, the server 102 selectively broadcast data to smartphones $109_i$ again based on a variety of target-specific tracklets from the targets $108_i$, and other environmental identifiers, obtained from the smartphones $109_i$, and combined with the target-specific tracklets in order to establish locational information about the one or more targets $108_i$. It should be appreciated that the broadcasted target-specific data is accomplished without knowing the internet protocol (IP) address or the media access control (MAC) address of the smartphones $109_i$.

Towards this end, the system 100 of the present disclosure provides a real-time end-to-end system to address the problem of digitally associating people in a camera view with their smartphones, without knowing the phones' IP/MAC addresses. The persons' unique "context features", extracted from videos, are used as the persons addresses. The context address include motion features, e.g. whether the persons are moving, and if so, the velocity and/or rotation; and ambience features, e.g. magnetic trend (i.e., change in the magnetometer reading as the persons move about an area) and WI-FI signal strengths. Once receiving a broadcast packet from the camera, a user's phone accepts it only if its context address matches the phone's sensor data. The identification data is prepared in the form of a selective header and attached to data of interest to be broadcasted by the server in the vicinity of the targets. When that matching occurs by the targets' smartphones, the additional selective data is then received by the smartphones and provided to the users via an application-specification program. In order to achieve this level of selectivity, three novel components are utilized in the system of the present disclosure: (1) definition of discriminative and noise-robust ambience features (e.g., magnetic trend and WI-FI signal strength at various locations); (2) ambient sensing map generation which provides the locational ambience features; (3) a context feature selection algorithm to dynamically choose lightweight yet effective features which are encoded into a fixed-length header. Real-world and simulated experiments are conducted for different applications/situations. The system of the present disclosure achieves a sending ratio of 98.5%, an acceptance precision of 93.4%, and a recall of 98.3% with ten people.

According to one embodiment of the present disclosure, camera-to-human communication is accomplished using a person's context features as his/her address. This is hereinafter called context address. A context address is not based on identifying a target based on his/her personal identity, but rather based on information available to the one or more cameras of a target's features. As discussed above, the context address includes motion features, e.g. walking velocity; and ambience features, e.g. magnetic trend of the target (i.e., changes in the magnetic output of a magnetometer based on various locations within the view of the camera) and WI-FI signal strengths in user's trajectory (i.e., the WI-FI signal strength at each location of the target's position). These two sets of context features are used in combination in order to improve positive identification of a person to whom the server 102 of FIG. 1 provides a broadcasted signal which will match with a high degree of probability to information the smartphone $109_i$ of the person $108_i$ also carries and develops in real time independent of the server 102. Thus, no specific personal identification is determined based on a person's identity but rather what is available about the person's from the perspective of the one or more cameras $104_i$.

The diversity in these context features as well as the consistency within these features and mobile sensor data result in excellent percentage of successful matching with the targets $108_i$. Among these extracted features, the ones that maximize the differentiation between the target individual and the rest of the targets are selected to serve as the target's context address.

According to one embodiment of the present disclosure, the context address is compressed and added as a header in an application layer an attached to other useful information with which the target $108_i$ may have an interest. The server then broadcasts the packet and the information.

On the target's side (usually referred to as the client side), upon receiving a broadcast packet, a smartphone $109_i$ of the user $108_i$ generates corresponding features from its sensor data and compares them with the context address in the packet. If the matching score is above a threshold, the message is indeed deemed to be targeted for that particular target $108_i$ and is relayed to the software application on the corresponding smartphone 109i. In doing so, selecting an optimal set of features that is discriminative and with a limited overhead for the information that is to be exchanged is one of the challenging aspects according to the present disclosure.

While the actual reduction to practice of the present disclosure is based on GALAXY S5 as the smartphone $109_i$ and a server designed in a pipelined and parallel manner, running on three personal computers with dual NVIDIA GTX 1080 Ti SLI, many other smartphone models and computing devices are available and suitable for the system 100 of the present disclosure. In the actual reduction to practice of the present disclosure, which was based on an art gallery traffic, messages were broadcast to ten users with a sending ratio (defined as the number of packets successfully sent over the total number of attempts) of 98.5%, an acceptance precision (which represents the ratio of the messages accepted by a user for whom the messages are actually targeted) of 93.4%, and a recall of 98.3% (defined as the ratio of the messages targeted for a specific target which are successfully accepted by the target).

In addition to the actual reduction to practice, a simulated reduction to practice was also carried out in a retail store demonstrating practical scenarios with larger number of individuals (e.g., 50) and mode complicated magnetic and WI-FI environments.

The context address is compressed into a header of maximum 40 bytes, which is the same as an 1Pv6 header. A 1Pv6 header is a smallest IP protocol packet communicated via the IP protocol across an IP V6 network (hence, IPv6).

Figure 2:
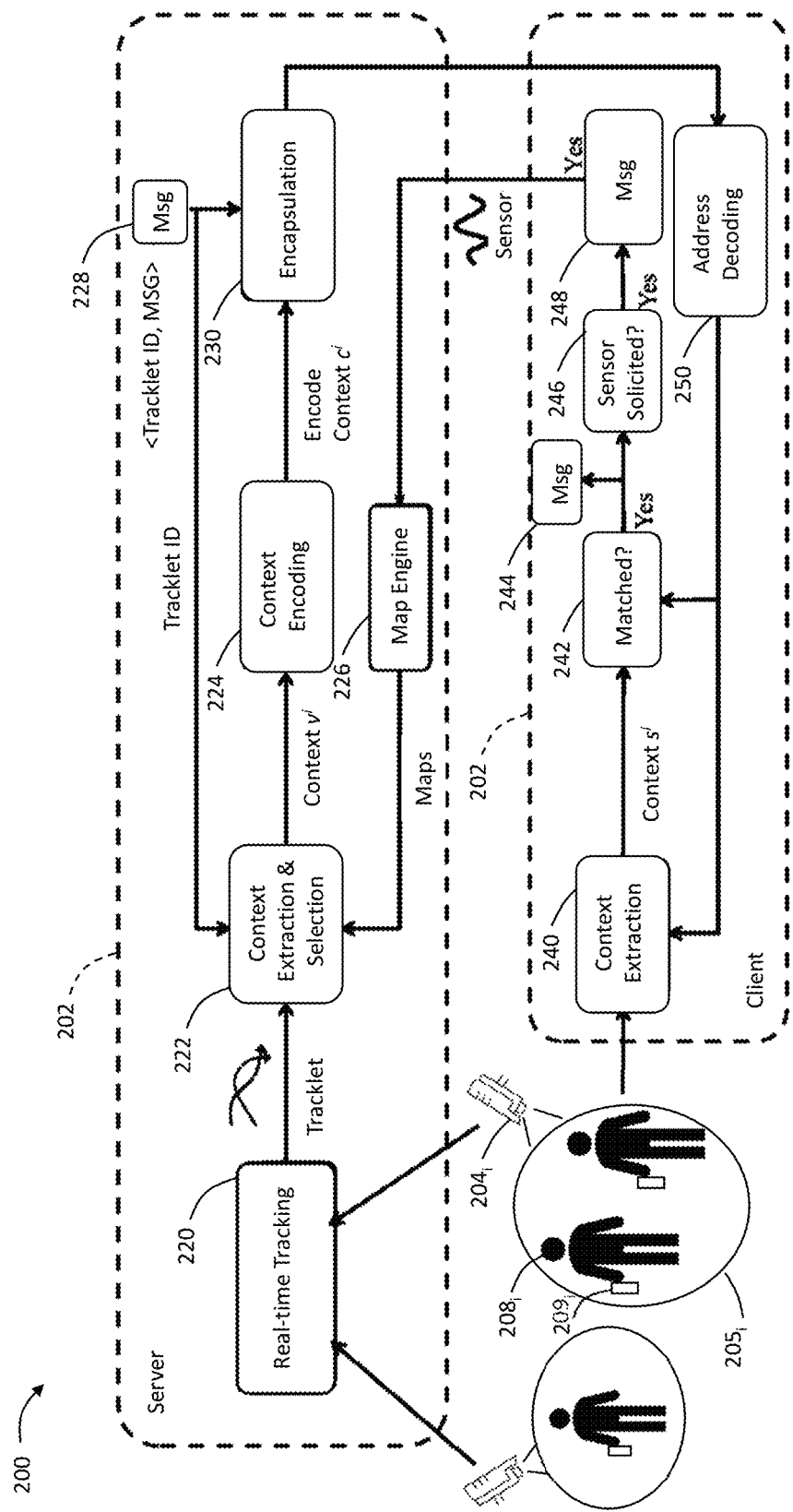
FIG. 2 is a schematic of a system including a server, one or more cameras, and one or more mobile device clients associated with one or more targets, according to one embodiment of the present disclosure.

Referring to FIG. 2, an overview schematic of a system 200, according to the present disclosure is provided. The system 200, similar to the system 100 shown in FIG. 1, includes three major components: a server 202, one or more cameras $204_i$, and one or more smartphones $209_i$ attached to one or more targets $208_i$. Each of the smartphones $209_i$ represent a client 240.

The one or more cameras $204_i$ continuously monitor an area of interest identified in the figure as $205_i$ and stream a video feed to the server 202. A typical target recognition is performed on the video frames in a real-time tracking block 220—an example target recognition and tracking method is described in U.S. Pub. App. 20180324141 for Wang et al., incorporated by reference in its entirety into the present disclosure, however other algorithms known to a person having ordinary skill in the art are within the ambit of the present disclosure. The target recognition and tracking algorithm then stores information about the targets and associated features. This process is repeated on a number of consecutive frames until target information are pooled into tracklets, each representing a target from one or more camera views. The tracklets are then provided to context extraction and selection block 222.

At this point, the system 200 of the present disclosure, the server 202 includes a map of ambience for the field of view of the one or more cameras, that is generated by a map engine 226. The context addressed is then encoded into a header in a context encoding block 224 and appended to a predetermined message in the encapsulation block 230.

The map of ambience, includes parameters such as magnetic trends and WI-FI signal strength, however, other environmental parameters may also be included, known to a person having ordinary skill in the art, e.g., amount of ambient light present at a particular location at a particular time of a day, ambient temperature at a particular location at a particular time of a day, etc. The ambience map is developed either i) apriori; or ii) in real-time from volunteering participants. In the apriori mode, the server 202 builds the ambience map during a training period. For example, employees of a business may walk around and provide ambience information to the server which then builds a map based on such training information. Depending on the training information, the resulting map may be time-dependent. For example, if ambient temperature is one of the ambience parameters, ambient temperature at various locations would be recorded as a function of time of day. However, if the ambience parameters are not sensitive to time of day, the parameters are simply recorded for each location in the area of interest. For example, WI-FI signal strength can be recorded at each location in an area of interest during a training period. Similarly, magnetometer outputs from smartphones of trainers can be communicated to the server 202 and recorded for each location in an area of interest.

On the other hand, the ambience parameters may be uploaded in a crowdsourcing approach from volunteering targets. As such, in real-time targets that appear in video framers upload ambience parameters in real-time and those parameters are then used to build a map based on the parameters and locations with an area of interest. It is possible for the server to use target-specific context parameters (e.g., target walking or standing, speed of movement, target rotating, etc.), while building the ambience map. In this case, the success rate of matching (discussed more fully below) between server target identification and client target matching may be lower than when a full ambience map is generated. However, as more and more video frames are processed and more and more volunteer data is made available, the matching improves.

Regardless of which training approach (discussed above) is utilized, a first set of context features (also herein referred to as context parameters) are extracted for each target from the pooled tracklets. Each feature is either based on i) target-specific parameters, e.g., the target's motion pattern (e.g. whether he/she is walking or standing still or rotating at a particular timestamp) or ambience (e.g. magnetic trend in its trajectory history). The motion pattern can be directly generated from the visual tracklets, while ambience relies on ambience maps. As discussed above, these maps are either generated apriori or generated in real-time with volunteer targets. Once the context parameters are developed (i.e., target-specific and ambience parameters), a header is generated that incorporated these parameters. This header is intended to distinguish one target from the rest based on the particular parameters. These then constitute the context address for the target.

Figure 3:
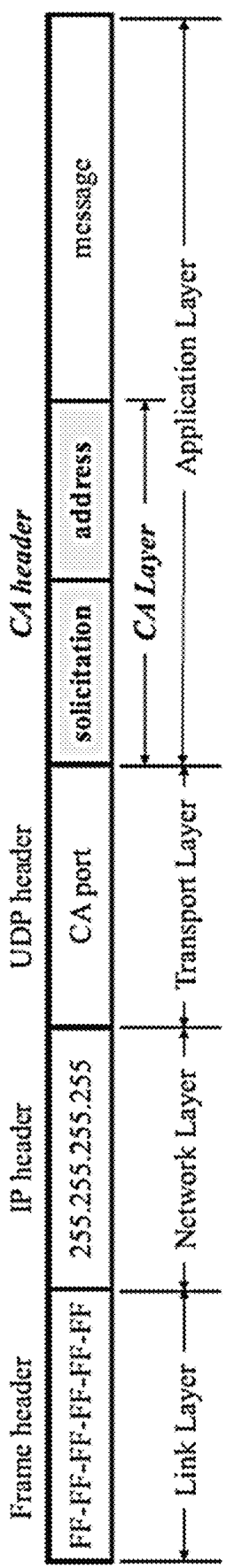
FIG. 3 is a schematic representation of a header made by the server of FIG. 2 to be appended to a message selectively constructed for wireless communication with the one or more mobile device clients of FIG. 2.

Each of the parameters has a predetermined length in the context address header. However, the overall context address header constitutes a fixed length in order to achieve consistency. A sample header is shown in FIG. 3, which provides an exemplary header according to present disclosure appended to a message to be broadcasted by the server 202. It should be appreciated that the provided header is only provided according to one embodiment; thus, other headers and formats are within the scope of the present disclosure. As shown in FIG. 3, the context address header may include solicitation from volunteer targets who have agreed to upload ambience data (e.g., magnetometer and WI-FI signal strength) at various locations within an area of interest. As discussed above, this data is obtained in real-time and is used to build and/or update the ambient sensing maps. The context address header is then combined with a message and broadcasted by placing into the application layer of a network packet while the destination IP/MAC address is set to all one's (i.e., unknown). The entire packet is then broadcasted through User Datagram Protocol (UDP) over WI-FI.

Various tasks performed in the server 202 are performed in a serial pipelined manner, while other tasks are performed in a parallel manner in order to meet the real-time requirement of the present disclosure (i.e., if the message with the tailored header is not broadcasted in time, e.g., when a target is standing in front of a painting, it would be highly desirable to provide a message containing information about the painting, or when a target is standing in front of a cereal section in the grocery, it would be highly desirable to provide a message containing a coupon, prior to the target moving away from the painting or the boxes of cereal).

As a result, targets can passively receive a plurality of broadcast messages and locally decide whether the message was intended for them. In order to make a match, the smartphone 209$i$ compares the header information to its own information. Towards this end, once a smartphone 209$_i$ held by a target 208$_i$, receives a broadcast message, the smartphone 209$_i$ extracts the context address in the header of the message. The smartphone 209$_i$ then decodes the corresponding target-specific and ambience context parameters from the extracted header, as shown in an address decoding block 250 and context extraction block 240. Next, the smartphone 209$_i$ compares the decoded target-specific context parameters with information it can retrieve from its own sensors, e.g., is the smartphone 209$_i$ moving, at what speed, at what rotational rate, etc. Next, the smartphone 209$_i$ compares the decoded ambience parameters with information it can retrieve from its own sensors, e.g., magnetometer readings, WI-FI signal strength reading, etc., as shown in a block titled matched 242. By comparing each feature in the context address with the smartphone's sensor readings, an overall matching score is calculated and used to decide if the message was intended for the target 208$_i$, as shown in block Msg 244. A predetermined threshold may be used to make this determination. Optionally, a hysteresis can also be used to avoid instantaneous match-no-match oscillation. If a match is determined to exist, the smartphone strips the message and passes on to upper-level applications.

As discussed above, if there is a solicitation in the header, the smartphone 209$_i$ based on whether the target 208$_i$ has volunteered to provide ambience parameters, may upload its sensor readings to the server 202, as shown in blocks sensor solicited 246 and Msg 248. This uploaded data, as shown in block MSg 248 can be used to generate the magnetic trend and WI-FI map using the map engine 226 on the server 202.

Figure 4:
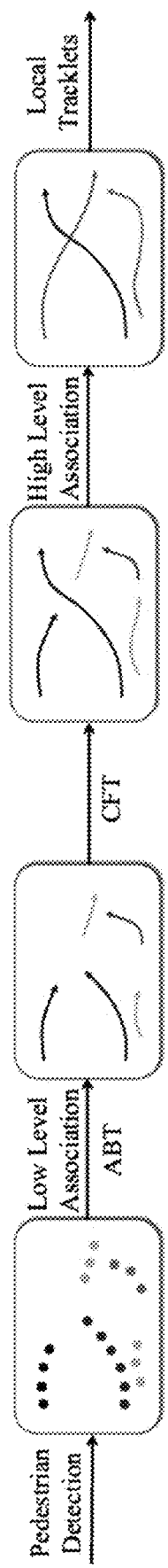
FIG. 4 is a schematic of a detection and tracking method by the server of FIG. 2 of the one or more targets of FIG. 2, according to one embodiment of the present disclosure.
Figure 5:
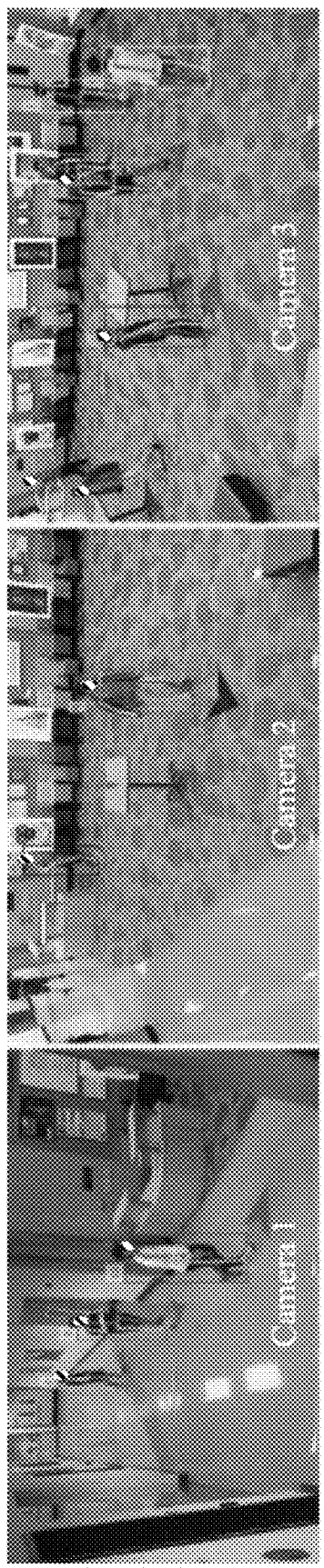
FIG. 5 is a collection of photographs one or more targets in the process of being detected and tracked by the method of FIG. 4, where faces are covered to protect privacy.

The first block of the server 202 is the real-time tracking block 220. To track targets through multiple cameras in real time, a pipelined and parallel scheme is utilized proposed made up of a state-of-the-art human pose detector (OpenPose), that was first used for pedestrian detection, as well as Association Based Tracking (ABT) which uses low-level association between detection responses from neighboring frames of the streamed video. Finally, the tracklets are extended via Category Free Tracking (CFT) with a Kalman filter applied to form local tracklets representing each person in a camera view. The local tracklets from all cameras are eventually merged into global tracklets in the entire covered area. This progression of different algorithms, each known by a person having ordinary skill in the art, is shown in FIG. 4, which is an exemplary schematic of steps involved in developing the tracklets, according to the present disclosure. Referring to FIG. 5, three exemplary screen captures from associated videos are shown in developing tracklets. It should be noted that when the targets are tracked in a video stream, a trace which contains the tracking results of a person in a series of video frames is called a tracklet. Tracklets are represented in FIG. 4 (the last window in the progression of windows in FIG. 4).

As discussed above, the target-specific context parameters include target's motion features. Since the tracking process generates locations of each person, a person's velocity can be computed by applying a Kalman filter on the target's locations, and further extracted into motion features with no extra computation cost.

With respect to motion features, the server 202 makes two separate determinations: 1) moving or standing still; and 2) rotation of the Target. For determining whether the target is moving or standing still, from the video feed and the determined velocity magnitude, the server 202 can determine whether the target is moving r standing still. With the smartphone 109$_i$, the smartphone's acceleration sensor can determine if the target is moving or not.

Similarly Relative Rotation of the target can be determined as the difference between a target's walking directions at a beginning and an ending of a motion period. With the smartphone $109_i$, rotation rates obtained from gyroscope are integrated into Relative Rotation. An adaptive threshold (=Kl+B) can be used to compensate gyroscope drift, where l is the time length of the motion period and K, B are parameters preset to 1°/s and 25°, respectively. If the rotation difference is within the threshold, then that that is taken as a match.

With respect to the ambiance parameters, the server 202 makes two separate determinations: 1) magnetic trend; and 2) WI-FI signal strength. Generation of the associated maps are explained in detail below; at this point in the present disclosure, the server 202 has a predetermined magnetic trend map and a WI-FI signal strength map. Each ambiance parameter is discussed separately, below.

Figure 6:
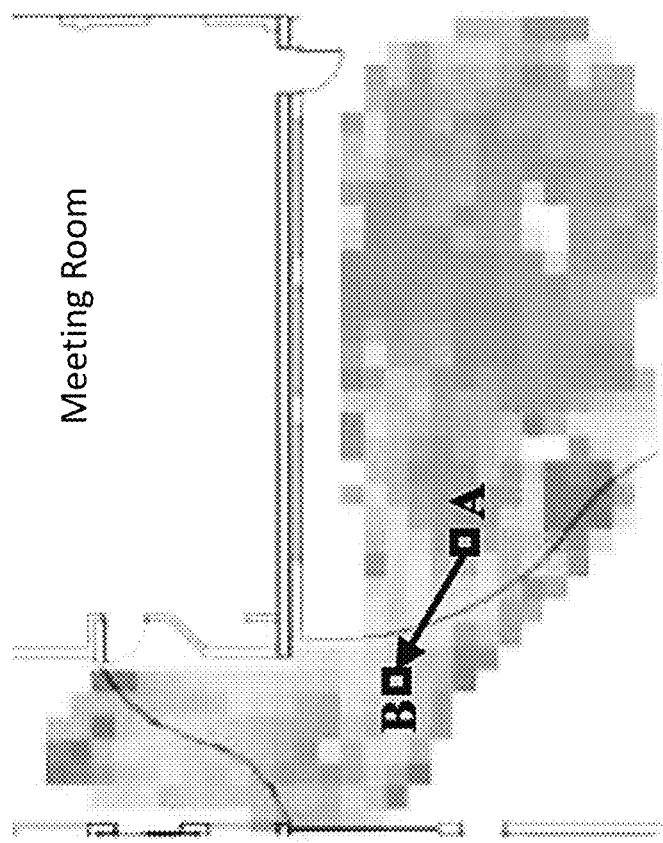
FIG. 6 is a magnetic trend map generated by the server of FIG. 2 to be used for generating ambiance context parameters, according to the present disclosure, representing a plurality of block in the area of interest.

Magnetic trend represents the difference between magnetometer readings in gravity direction between any two locations. Two parameters are chosen for evaluating magnetic trend: mean ($\mu$) and standard deviation ($\sigma$) of a plurality of readings at each location. For each pair of different locations, the difference is represented by a normal distribution using its mean ($\mu$) and standard deviation ($\sigma$) and stored in magnetic trend map. Referring to FIG. 6 a colored magnetic trend map is shown. The green and blue regions represent lower magnetometer readings, while the orange and red regions represent higher magnetometer readings. In FIG. 6, the arrow shows an exemplary increase in magnetic trend (i.e., $\mu_B > \mu_A$) between locations A and B. When a person moves from location A to location B, a ($\mu$, $\sigma$) pair is extracted by looking up the magnetic trend map with its two locations and provided as added data for the header.

With respect to the smartphones $109_i$, they periodically samples the magnetometer and gravity readings. The 3D magnetometer readings are first projected to gravity to eliminate the influence of the phone pose. The projected magnetometer readings are then used to calculate the difference between the two points and then to compare with ($\mu$, $\sigma$) communicated from the server 202 in the header. If the difference of the magnetometer readings from the smartphone $109_i$ is in the range of $\mu \pm \lambda \sigma$ (where $\lambda$ is a predetermined number, e.g., $\lambda$=2.5, for 98.8% confidence interval), the system 200 would consider the smartphone $109_i$ readings as a match with the server 202 output in the header.

Figure 7:
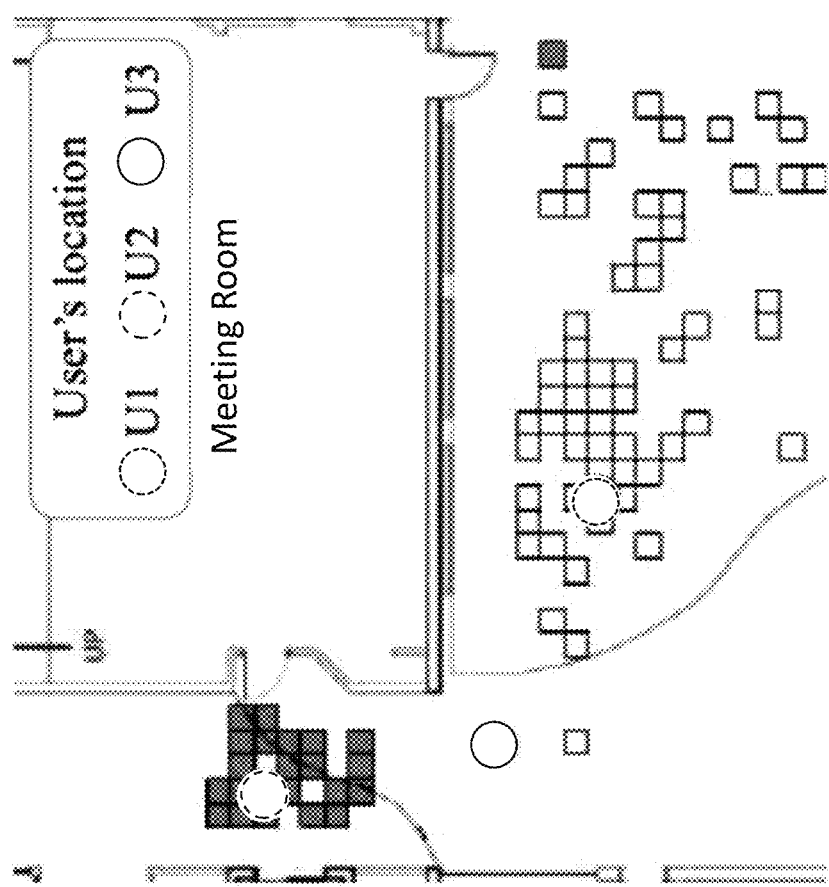
FIG. 7 is a WI-FI fingerprint map generated by the server of FIG. 2 to be used for generating ambiance context parameters, according to the present disclosure.

With respect to the WI-FI signal strength map, each location in an area of interest contains a series of WI-FI signal strength readings of $N_w$ each with a MAC address. For a specific location (defined here as a reference position), a point distinguishable from the reference position is one with a predetermined Euclidean distances from the reference position. The term "distinguishable" is a matter of a combination of Euclidean distances and stable WI-FI signal strength. To calculate Euclidean distances, the server 202 needs two sets of stable WI-FI signal strengths: the one at the current location and one at the reference position. At the server 202, from the tracking results (i.e., target-specific parameters, e.g., walking/standing still, velocity of movement, rotation of the target) at a certain timestamp, if a target user is placed at the reference position with a WI-FI signal strength, while some other targets are in the distinguishable region (i.e., the predetermined Euclidean distances away), WI-FI signal strength can be used as a distinguishing feature to identify target. Referring to FIG. 7, an exemplary WI-FI map is shown with three different targets (U1, U2, and U3) at different distinguishable positions. Suppose that U1 is at the reference position which represents the target for whom the broadcasted message is intended. U1 can be distinguished from U2 using WI-FI signal strength method of the present disclosure since U2 presents in the distinguishable region from the reference position (i.e., a predetermined Euclidean distance away), while U1 cannot be distinguished from U3 since U3 is not in the distinguishable region, in which case the WI-FI portion will not be placed in the header. Thus, if the WI-FI signal is distinguishable, it will appear in the header of the broadcasted message. According to one embodiment the distinguishable region is about 5 meters away from the reference position. This predetermined Euclidean distance is chosen to maintain a noise-tolerant WI-FI map.

On the smartphones $109_i$ side of the system 200, as a broadcasted message is received the smartphone (as discussed above) decodes the ambiance parameter related to the WI-FI signal strength and checks against its own reading of the WI-FI signal strength to determine if the message was indeed intended for it host target $108_i$. It should be noted that phones of different makes and models may register WI-FI signal strength differently. As a result, a calibration phase may be needed to make every smartphone $209_i$ in the system register the same WI-FI signal strength at various locations.

In order to standardize and compress the content of the header, each parameter (whether target-specific parameter or ambiance parameters) are encoded and compressed into bit strings. These bit strings are shown in Table 1.

TABLE 1

| Header bit format | | | | | |
|---|---|---|---|---|---|
| Feature | Type | $\Delta t_1$ | $\Delta t_2$ | Content | Total |
| Moving Or Not | 3 | 5 | — | 1 | 9 |
| Relative Rotation | | | 5 | 18 | 31 |
| Magnetic Trend | | | 5 | 18 | 31 |
| Wi-Fi Fingerprint | | | — | ~75 | ~83 |

In table 1, the type of parameter is represented by 3 bits—although 2 bits may be sufficient for this field. Timestamp is represented by 5 bits (e.g., $\Delta t_1$ or $\Delta t_2$—according to one embodiment, the oldest feature used by the server 202 is from about 30 seconds ago, thus there are 5 bits for the "timestamp" which refers to the time passed since a certain feature was determined, e.g., 1 s, 10 s, 20 s, 30 s, ... ). Either one or two timestamps are needed, depending on whether the feature contains an absolute or relative value. The content length varies among different features. For example, the type "Moving Or Not" needs 1 bit to represent two states. Relative Rotation is assigned 9 bits to represent an angle (0-360°). Magnetic Trend uses 18 bits—9 bits for $\mu$ and 9 bits for $\sigma$. WI-FI Fingerprint uses, on average, 75 bits to specify 15 WI-FI signal strength values with different MAC addresses (of the router). It should be noted, however, that this is not a fixed cost since the WI-FI signal strengths is encoded using a variant of Huffman coding, known to a person having ordinary skill in the art, based on empirical frequencies. The MAC addresses are sent only once when a user enters the covered area so the cost is not included.

Since not all of the parameters (whether target-specific and ambiance parameters) are able to distinguish one target from another (i.e., two targets may be indistinguishable using the WI-FI signal strength parameter), the server 202 determines which of these parameters should be included in the header in order to successfully distinguish targets from one-another. Towards this end, the server 202 defines a binary function D, where D(f', f")=1 if two instant features f', f" are different (i.e., distinguishable targets). f'(=$f_{target_i}^{type_k}(\vec{t})$) and f"(=$f_{target_j}^{type_k}(\vec{t})$) represent features with the same type and the same timestamp, however for different targets.

Based on D, the server 202 builds a feature table T for each target to which it intends to send broadcasted messages. T is of size m×n, where each row is for one feature with a certain type and a particular timestamp, and each column is for a person besides the target. According to one embodiment, the parameters from the last 30 seconds and which are distinguishable among ten users results in a typical size of T of 876×9. Each entry $T_{ij}$ is 1 only if the $j^{th}$ user can be discriminated from the target by using the $i^{th}$ feature. Each feature is also associated with a predefined payload cost, An exemplary feature table T is shown in Table 2. This entire table is for one target. In this example table, the target is user 1, and the table has one column for each of the other individuals which are not targets of an intended message. Each row represents one feature, each entry means if a certain user can be distinguished from the target using a certain feature. E.g. the first value which is 1, means that user 2 can be distinguished from the target (user 1) using the first feature. For example $T_{11}$=1 means that target 2 can be distinguished from target 1 by Moving Or Not at time ($\vec{t}$).

TABLE 2

Table T showing parameter matrix

| Feature | User 2 | User 3 | User 4 | Cost |
|---|---|---|---|---|
| $f^{Moving\ Or\ Not}(\vec{t_1})$ | 1 | 0 | 0 | 9 |
| $f^{Magnetic\ Trend}(\vec{t_2})$ | 0 | 1 | 1 | 31 |
| $f^{Relative\ Rotation}(\vec{t_1})$ | 0 | 0 | 1 | 31 |
| $f^{WiFi\ Fingerprint}(\vec{t_3})$ | 1 | 1 | 0 | 46 |
| $f^{WiFi\ Fingerprint}(\vec{t_4})$ | 0 | 1 | 0 | 83 |
| : | : | : | : | : |

To determine the value for $T_{ij}$ for the matrix shown in Table 2, two task need to be performed. First the server 202 checks whether the features f' for both a specific target and other users/target near the target are valid. For an ambience feature, the server 202 defines "valid" when a corresponding value can be found for target but not for other users.

The second task involves time delays inherited from video feed and packet propagation. As a result, a recorded timestamp may shift by a small amount from its actual value. Thus the server 202 considers a small amount of Δt from the actual timestamp which represent stable target parameters across a shift period Δs (e.g., 0.5 s). Specifically, a parameter f' is considered to be stable at time ($\vec{t}$)=(Δt$_1$, Δt$_2$), if $$\forall s \in [0, \Delta s], D(f_{target}^i(\vec{t}), f_{target}^i(\overrightarrow{t+s}))=0.$$

The server 202 also considers the time shift when comparing a specific target and other users/targets. A feature is considered to be discriminative between a target and another user j if $$\forall s \in [0, \Delta s], D(f_{target}^i(\vec{t}), f_j^i(\overrightarrow{t+s}))=1.$$

Therefore, $T_{ij}$=1, only if all the above conditions are met.

According to one embodiment of the present disclosure, a function is defined by the server 202 in an attempt to choose which parameter(s) are best suited to distinguish between a specific target and other users/targets to be placed in the header while not violating the maximum number of bytes (40) for the header. This function is referred to as a distinguishing power vector P. Function P is the sorted sum of selected rows in feature table T (table 2), where P is defined by:

$$\max P = \text{sort}\left(\sum_{i \in I} T_i\right) \text{ s.t.} \sum_{i \in I} C_i \leq C_m$$

where sort( ) ascendingly sorts the elements of a vector, and $T_i$ is the $i^{th}$ row of matrix T. I⊆F is selected feature set. Lexicographical maximization of this sorted vector P guarantees that we have high distinguishability even for the least distinguishable user j, where j is the index of the smallest element in $\Sigma_{i \in I} T_i$. When the server 202 determines the normalized distinguishing power $\hat{P}=P_1/|I|$ where P is already sorted and $P_1$ is the first element in P, is above a threshold (e.g., 0.1), the server 202 will broadcast the message. If this condition is not met, the attempt of sending the packet fails. A sending ratio is defined as the number of packets successfully sent over the total number of attempts. We formulate a local search strategy (Algorithm 1) to solve this computationally difficult optimization problem. It begins with an empty set and keeps applying local changes to the selected feature set I by adding, removing or substituting one feature at a time. The iteration stops when $n_{iter}$ reaches a predefined limit $n_{max}$. For each iteration, the server 202 greedily maximizes the increase of P by enumeration. This resulting converged set I is used as the context address for the target user.

The context address header, also includes other fields. The fields include the normalized distinguishing power $\hat{P}$ (7 bits) as a threshold for context matching on the client side. Moreover, depending on the completeness of stored maps and recent locations of the target user, the server occasionally requests the target to voluntarily upload its magnetometer data and/or scanned WI-FI signal strengths. The solicitation for this data uses 2 bits to convey whether each type is needed. Alongside the solicitation field, the transaction ID of this request (8 bits) is used to keep track of the sensor data received from the targets later on. The context address header, containing all the above fields as well as the selected context features, is organized and encoded. The context address header is then put into the application layer of a packet along with an application message (as shown in FIG. 3). The server then broadcasts the packet to all the users in the area of interest.

Upon receiving a broadcast packet, the smartphone 209$_i$, extracts the context address header and decodes all fields described above. The phone extracts its corresponding sensor data for each feature at the time computed by subtracting $t_1$ and $t_2$ from the current time on the phone. It should be noted that packet propagation delay does not need to be accounted for by the smartphone 209$_i$ since it has already been dealt with during context selection (see above). Each smartphone-based feature is then obtained from the sensors onboard the smartphone 209$_i$ and compared with the same features decoded from the header. The matching scores for each parameter are averaged to obtain an overall matching score for this packet. If the matching score is greater than $\hat{P}/2$ in the extracted/decoded context address header, the smartphone 209$_i$ accepts the message in the packet and forwards it to upper-level application as an indication the message is intended for the smartphone 209$_i$ for further processing of the message.

Upon accepting a message, the smartphone 209$_i$ also checks the solicitation fields in the packet and may volunteer to upload the requested sensor data, e.g. magnetometer readings or scanned WI-FI signal strengths to the server 202. This upload will only occur if the target $208_i$ has agreed to volunteer the information by choosing the appropriate switches in the application layer.

Figure 8A:
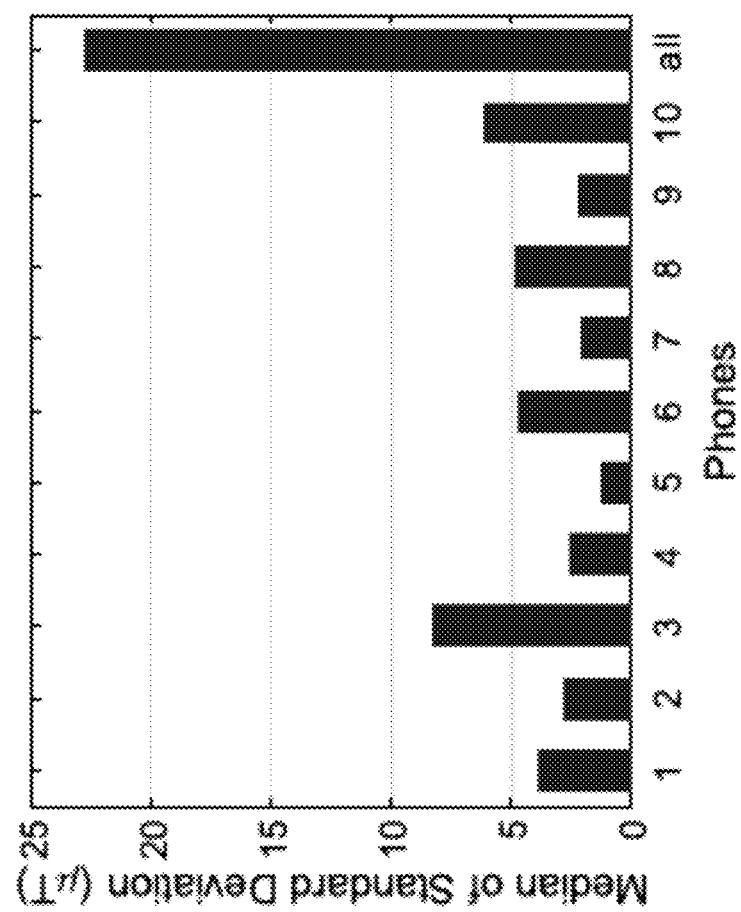
FIG. 8a is a bar graph of median standard deviation (μT) vs. 10 phones (based on phone identifications assigned to each smartphone) which shows the median of standard deviations of projected magnetometer readings among all blocks in the area of interest.

The magnetic trend map generation is now discussed. The server 202 initially divides an area of interest from the video frames into a grid of 0.5 m×0.5 m squares (defining the resolution of the map). Upon receiving voluntarily uploaded magnetometer data from a smartphone $209_i$, the server 202 first projects the magnetometer readings to gravity to eliminate the influence of the phone pose. A magnetometer has readings in X, Y, and Z directions (for a Cartesian coordinate system, but other coordinate systems are also suitable). When a phone is held at an angle (i.e., a pose that is not parallel to ground), "G" represent the direction of gravity (i.e., a fourth axis that is pointed towards the center of Earth). G can be measured by a built-in accelerometer sensor. By "projecting the magnetometer readings to gravity", the server 202 obtains components of X, Y, and Z on the G axis and those components are algebraically added to obtain a value on the G. This projected magnetometer reading will always be along gravity direction, which is not affected by how a user is holding the phone (i.e. phone pose). In effect, the pose of the phone is normalized with respect to the direction of gravity. As the time and location series can be easily obtained from the visual tracking process, a straightforward way is to directly use the magnetometer reading in the direction of gravity as a fingerprint. The problem is that different smartphone models and sensor quality may affect the absolute sensor readings, which can be a non-negligible source of errors. Referring to FIG. 8a, a bar graph of median standard deviation (μT) vs. 10 phones (based on phone identifications assigned to each smartphone) is provided which shows the median of standard deviations of projected magnetometer readings among all blocks. In the same block, the projected readings collected from the same target $208_i$ are consistent while the entire dataset from all targets $208_i$ are scattered. Thus, if a relative trend between the magnetometer readings are used from two different blocks collected by the same smartphone $209_i$, it is more stable than using the absolute values from different devices.

Figure 8B:
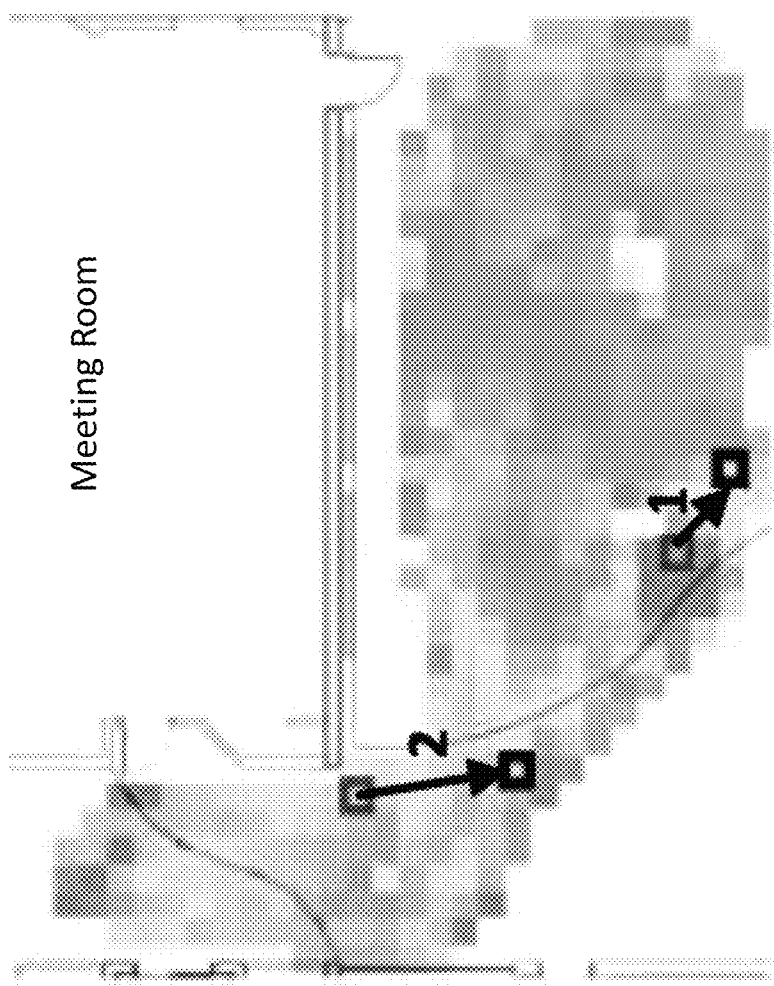
FIG. 8b is a schematic of magnetic trends, where there are two pairs of blocks, whose magnetic trends are labeled as trend 1 and trend 2, respectively.
Figure 8C:
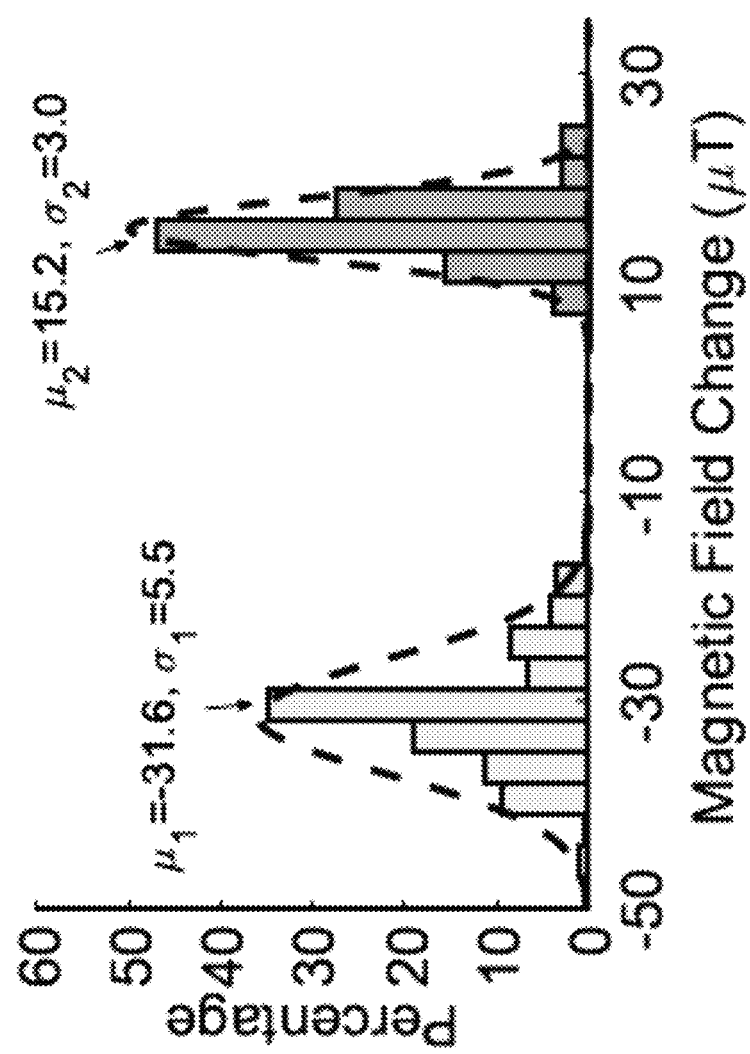
FIG. 8c is a graph of a percentage change vs. magnetic field change (in μT) which shows a normal distributions representing the two magnetic trends of FIG. 8b.

Therefore, a difference between the projected magnetometer readings from one user is computed and added to the map, only when the user walks from one block to another (i.e., grids of the map, discussed above). For each pair of blocks, we approximate these differences into a normal distribution, which is represented by its mean (μ) and standard deviation (a). Referring to FIG. 8b, a schematic of magnetic trends is shown, where there are two pairs of blocks, whose magnetic trends are labeled as trend 1 and trend 2, respectively. Referring to FIG. 8c, a percentage change vs. magnetic field change (in μT) is shown. FIG. 8c shows the normal distributions representing these two magnetic trends, where the two 98.8% confidence intervals do not overlap. Therefore, when using magnetic trend features as described above, a person who passes the block pairs of trend 1 can be distinguished with high confidence, from another person who passes the block pairs of trend 2 at the same timestamps. Using a distribution instead of a single value to represent magnetic trend provides tolerance to possible fluctuations caused by sensor noises.

Similarly a WI-FI map is also generated by the server 202. The WI-FI fingerprint map is generated through a multi-step process. Similar to magnetic trend, the server may receive scanned WI-FI signal strengths from volunteer targets. First, for each MAC address and each block, the server 202 computes the median of the WI-FI signal strengths from all user data (i.e., volunteer data uploaded to the server 202). Secondly, the server 202 calculates the variance of the medians, var, for each MAC address. var represents how the WI-FI signal strength differs across the blocks. Thirdly, the MAC addresses are then sorted decreasingly by var and the top $N_w$, (=15) MACs are selected for higher distinguishability among different locations. Finally, WI-FI fingerprint map is generated for all blocks in the grid. It stores the medians of the WI-FI signal strengths of the selected MACs. All other blocks with large Euclidean distances to the reference position (described above), i.e. over a threshold of 10 dB, are marked as the distinguishable region of the reference position.

Figure 9C:
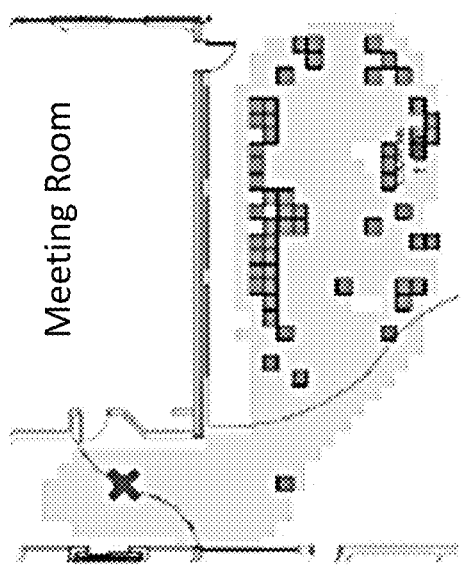
FIGS. 9a, 9b, and 9c are WI-FI maps for a reference position marked by "X" after 2 minute (FIG. 9a), after 4 minutes (FIG. 9b), and after 6 minutes (FIG. 9c) of developing the WI-FI maps from volunteer users.
Figure 9B:
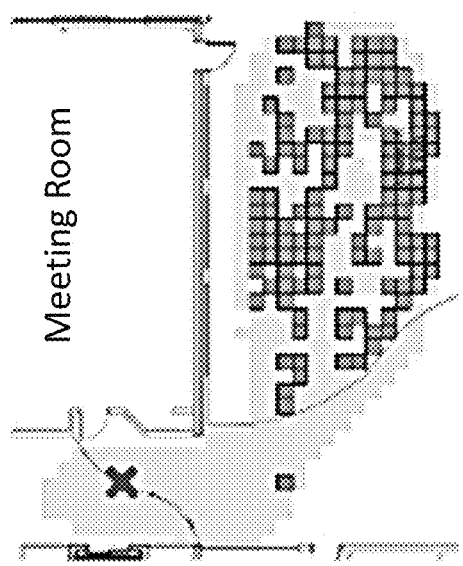
Figure 9A:
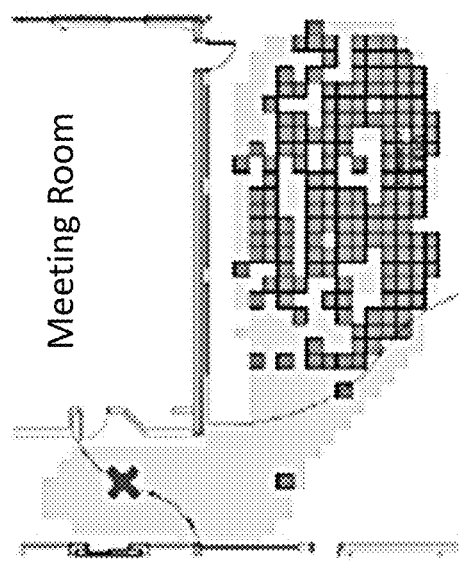

Referring to FIGS. 9a, 9b, and 9c, WI-FI maps are shown for a reference position marked by "X" after 2 minute (FIG. 9a), after 4 minutes (FIG. 9b), and after 6 minutes (FIG. 9c). The walkable region is shown by light shade and the distinguishable region by dark shade. With time, as more and more data is contributed by volunteers, the distinguishable region grows, showing that the difference between the reference position and the other blocks becomes clearer. Thus, if a target user is tracked located at the reference position in this map while another user is in the distinguishable region, this WI-FI Fingerprint feature can be selected to distinguish these two users.

In practice, the server 202 does not need to frequently send solicitation requests. Once the collected dataset is large enough, the server holds back on solicitation for that area. An expiration time can also be set to void outdated sensing data.

To prove the efficacy of the system and methods described in the present disclosure, an actual reduction to practice of the system was made and described here below. Three SAMSUNG GALAXY S5 smartphones were used as IP cameras to capture and stream videos at a frame rate of 13 fps, a bit rate of 2000 kbps, and a resolution of 800×480. A server was set up on three PCs with dual NVIDIA GTX 1080 Ti SLI, and which ran MATLAB and C++ programs on each. A software called ClockSynchro is used to synchronize these computers. Google Pixel XL smartphones are employed as smartphones (i.e., 209i as shown in FIG. 2), which log accelerometer, gyroscope, gravity, magnetometer readings, and WI-FI scan results at 400 Hz, 400 Hz, 200 Hz, 50 Hz and 1 Hz respectively. They also run ANDROID client app to receive packets and messages therewith.

Figure 10B:
FIG. 10b is an example frame from one camera of FIG. 10a with 10 users in the gallery, where faces of the subjects are blocked off for privacy purposes.
Figure 10A:
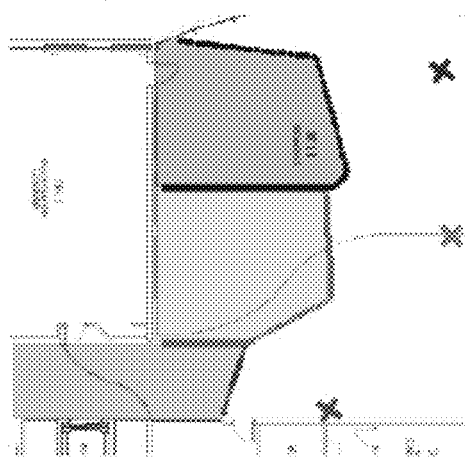
FIG. 10a is a schematic of an actual reduction to practice of an area of interest with shades and the camera positions marked with crosses representing 10 volunteers naturally walking around or stopping by at various paintings as they please, each with a smartphone placed in their pockets.

The particular environment for the testing in this experiment was an "art gallery" in a university lobby with a walkable area of 107 m². The area covered by each camera is shown in FIG. 10a with shades and the camera positions are marked with crosses. 10 volunteers naturally walked around or stopped by at the paintings as they please, each with a smartphone placed in their pockets. FIG. 10b shows an example frame from one camera, with 10 users in the gallery (faces of the subjects are blocked off for privacy purposes). The utility of the context address was tested by sending messages to all 10 users every two seconds, i.e. 6000 messages sent in a 20-minute session.

Figure 11:
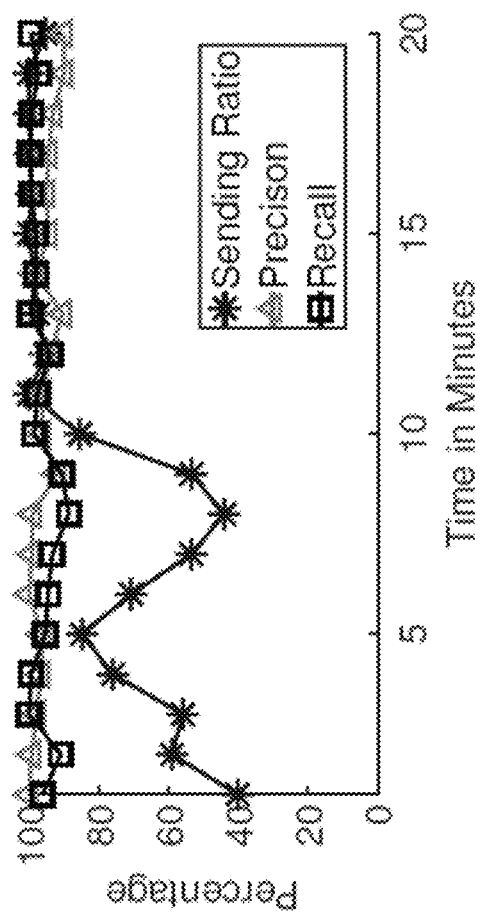
FIG. 11 is a graph of precision, recall, and sending ratios (measures of success of the system of the present disclosure) vs. time in minutes.

The overall precision and recall rate of the system 200 was evaluated. The precision represents the ratio of the messages accepted by a user which are actually targeted for him/her. The recall is the ratio of the messages targeted for a specific user which are successfully accepted by him/her. Referring to FIG. 11, a graph of precision, recall, and sending ratios are shown vs. time in minutes. As magnetometer and WI-FI readings gradually contribute to the map generating process, the performance starts to improve after about 10 minutes. After this initial startup period, the average precision of the system of the present disclosure is 93.4% throughout the last 10 minutes while the recall rate is 98.3%. Moreover, the sending ratio (defined above as the number of packets successfully sent over the total number of attempts) increases sharply and reaches an average of 98.5%. The combination of motion and ambience features leads to an overall high precision and recall rate, showing that the context features used have a high distinguishability and the maps are stable over time.

Table 3 provides the median of computation time for different processing stages through 20 minutes. The total computation time is 3.2 seconds, in which the tracking process takes the largest portion, i.e. 1.5 seconds. Other stages, i.e. context extraction, context selection and packaging, and client side processing, take 1.3, 0.2 and 0.2 seconds respectively.

TABLE 3

End-to-End computation time

| Stage | Time in Seconds |
| --- | --- |
| Tracking | 1.5 |
| Context extraction | 1.3 |
| Context selection and packaging | 0.2 |
| Client-side processing | 0.2 |
| Total | 3.2 |

Figure 12:
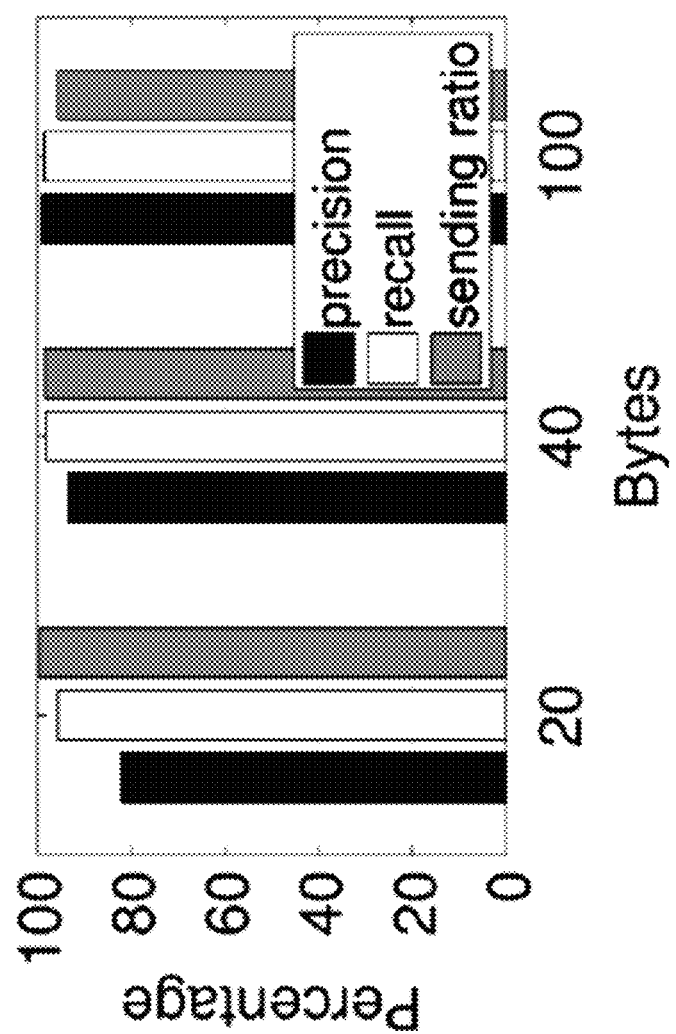
FIG. 12 is a graph of precision, recall, and sending ratios described in FIG. 11 vs. time in minutes for different number of bytes in the header.

The maximum number of bytes for the context address header was set to 20, 40 and 100 bytes. Referring to FIG. 12, a graph of precision, recall, and sending ratios are shown vs. time in minutes for different number of bytes. When the limit is set to 40 bytes (i.e. same as an IPv6 header, discussed above), it already achieves similar performance as when it is extended to 100 bytes. At 40 bytes for the header, the overhead is significantly less than other similarly situation IP communication formats.

Figure 13:
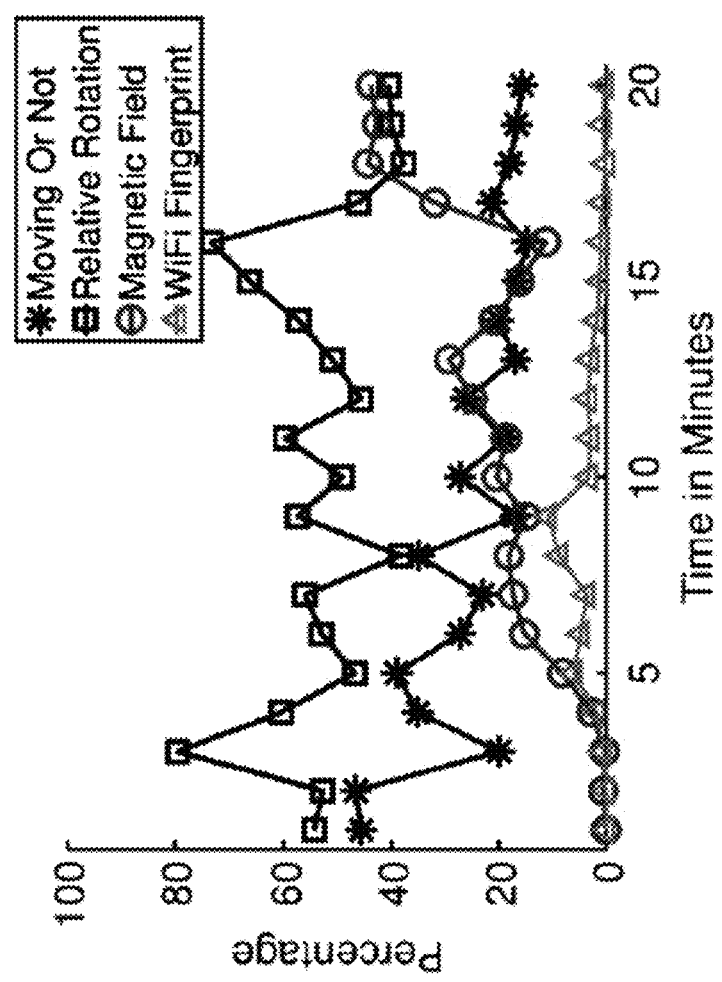
FIG. 13 is a graph of types of context features selected over time, representing percentage of a time unit taken for each context parameter to process.

The types of context features selected over time are shown in FIG. 13, representing percentage of a time unit taken for each context parameter to process. During the initial period, only Move or Not and Relative Rotation are selected. This is because the system was at a startup stage, waiting for users to voluntarily upload their sensor data. With more and more valid sensor data contributed to building the ambient sensing maps, Magnetic Trend and Wi-Fi Fingerprint features start to be selected. The percentage of Magnetic Trend increases greatly after the first 4 minutes. The WI-FI Fingerprint has limited contribution because its payload cost is larger than the other three types. As described above, the ambiance features can be uploaded apriori and thus the higher percentage of successful operation can be achieved immediately.

Figure 14:
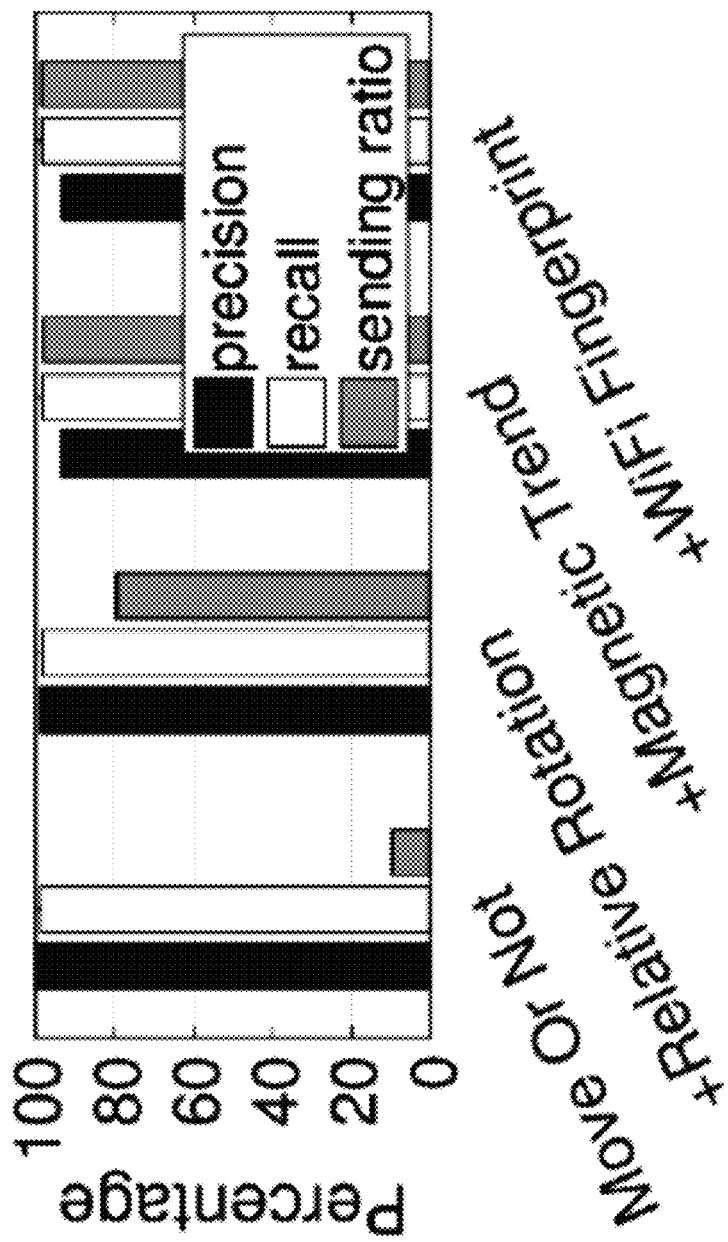
FIG. 14 is a graph of precision, recall, and sending ratios described in FIG. 1 vs. different context features.

Referring to FIG. 14, a graph of precision, recall, and sending ratios are shown vs. different context features which shows how the system performance changes when adding different types of context features. When adding more types of features, the sending ratio is largely enhanced while the precision and the recall remain high.

Ground truth maps are built via ground truth messaging destinations to get all available sensor data from the users. Magnetic trend map is evaluated in terms of errors of the mean and the standard deviation of the difference in each pair of blocks. FIGS. 15*a* and 15*b* show graphs of cumulative distribution function (CDF) vs. estimation errors which show that as there are more and more sensor data, errors of the mean (FIG. 15*a*) and the standard deviation of the difference (FIG. 15*b*) gradually and steadily decrease over time. After about 10 minutes, the median of both errors drops below 1.5 μT. This implies that the map generation converges in a short time. Similarly, we evaluate the errors of WI-FI Fingerprint map by calculating the distances from the medians of WI-FI signal strengths. FIG. 15*c* shows that as more WI-FI readings are uploaded, the WI-FI fingerprint map gradually approaches the ground truth.

Those having ordinary skill in the art will recognize that numerous modifications can be made to the specific implementations described above. The implementations should not be limited to the particular limitations described. Other implementations may be possible.

The invention claimed is:

1. A client-server system adapted to broadcast selective messages to one or more clients without knowing the internet protocol address of the clients, comprising:
   a server having a server processor adapted to execute a computer-readable program encoded on a non-transitory computer-readable medium;
   one or more cameras in communication with the server each adapted to provide a video feed of an area of interest;
   one or more client mobile devices each hosted by a corresponding user (target), each of the one or more client mobile devices adapted to receive broadcasted signals form the server, wherein the server processor is configured to:
   receive video feeds from the one or more cameras;
   perform target recognition and tracking on the one or more targets, including position of the one or more targets;
   extract target-specific context parameters from the one or more recognized and tracked targets;
   encode the target-specific context parameters into a header, thereby generate a context address for the one or more targets;
   append the context address to a message for the one or more targets from a predetermined set of messages based on the position of the one or more targets, thereby generate one or more packets of information; and
   broadcast the one or more packets wirelessly to the one or more client mobile devices.

2. The client-server system of claim 1, wherein the target-specific context parameters include an identifier as to whether the one or more target is moving.

3. The client-server system of claim 1, wherein the target-specific context parameters include an identifier as to the velocity of the one or more targets.

4. The client-server system of claim 1, wherein the target-specific context parameters include an identifier as to degree of rotation of the one or more targets.

5. The client-server system of claim 1, wherein the server processor is configured to establish one or more ambiance maps of the area of interest based on one or more ambiance context parameters.

6. The client-server system of claim 5, wherein the one or more ambiance maps include a map of magnetic trends in the area of interest based on subdividing the area of interest into a plurality of smaller subdivided areas.

7. The client-server system of claim 6, wherein the server processor is configured to add the magnetic trend obtained from the magnetic trend map based on the position of the one or more targets to the header.

8. The client-server system of claim 7, wherein the one or more ambiance maps include a map of WI-FI signal strength (WI-FI fingerprint) in the area of interest based on subdividing the area of interest into a plurality of smaller subdivided areas.

9. The client-server system of claim 8, wherein the server processor is configured to add the WI-FI fingerprint obtained from the magnetic trend map based on the position of the one or more targets to the header.

10. The client-server system of claim 9, wherein the one or more client mobile devices configured to i) receive the message, ii) extract the header; iii) decode the header into target-specific context parameters and ambiance context parameters; iv) compare values of the target-specific context parameters and ambiance context parameters with onboard sensor reading; v) assign a score based on the comparison; vi) compare the assigned score to a predetermined threshold; and vii) if the assigned score is above the predetermined threshold indicating the broadcasted message is intended for the one or more targets, then display the associated message on an associated screen of the associated client mobile device.

11. A method of selectively broadcasting a message to a client by a server without knowing the client's internet protocol (IP) address, comprising:
receiving video feeds of an area of interest from one or more cameras in communication with a server;
performing target recognition and tracking on one or more targets in the area of interest, including position of the one or more targets;
extracting target-specific context parameters from the one or more recognized and tracked targets;
encoding the target-specific context parameters into a header, thereby generating a context address for the one or more targets;
appending the context address to a message for the one or more targets from a predetermined set of messages based on the position of the one or more targets, thereby generating one or more packets of information; and
broadcasting the one or more packets wirelessly to one or more client mobile devices each associated with the one or more targets.

12. The method claim 11, wherein the target-specific context parameters include an identifier as to whether the one or more target is moving.

13. The method of claim 11, wherein the target-specific context parameters include an identifier as to the velocity of the one or more targets.

14. The method of claim 11, wherein the target-specific context parameters include an identifier as to degree of rotation of the one or more targets.

15. The method of claim 11, further comprising:
establishing one or more ambiance maps of the area of interest based on one or more ambiance context parameters.

16. The method of claim 15, wherein the one or more ambiance maps include a map of magnetic trends in the area of interest based on subdividing the area of interest into a plurality of smaller subdivided areas.

17. The method of claim 16, further comprising:
adding the magnetic trend obtained from the magnetic trend map based on the position of the one or more targets to the header.

18. The method of claim 17, wherein the one or more ambiance maps include a map of WI-FI signal strength (WI-FI fingerprint) in the area of interest based on subdividing the area of interest into a plurality of smaller subdivided areas.

19. The method of claim 18, further comprising:
adding the WI-FI fingerprint obtained from the magnetic trend map based on the position of the one or more targets to the header.

20. The method of claim 19, further comprising:
the one or more client mobile devices receiving the message;
the one or more client mobile devices extracting the header;
the one or more client mobile devices decoding the header into target-specific context parameters and ambiance context parameters;
the one or more client mobile devices comparing values of the target-specific context parameters and ambiance context parameters with onboard sensor reading;
the one or more client mobile devices assigning a score based on the comparison;
the one or more client mobile devices comparing the assigned score to a predetermined threshold; and
if the assigned score is above the predetermined threshold the one or more client mobile devices indicating the broadcasted message is intended for the one or more targets, then displaying the associated message on an associated screen of the associated client mobile device.

* * * * *